Jan. 7, 1969  L. B. LOGAN  3,421,049

SEQUENCING DEVICE FOR DISPLAY LIGHTING

Filed Dec. 6, 1965 Sheet _1_ of 4

INVENTOR:
LLOYD B. LOGAN
BY:
*Bedell & Burgess*
ATTORNEYS

# United States Patent Office 3,421,049
Patented Jan. 7, 1969

3,421,049
SEQUENCING DEVICE FOR DISPLAYING
LIGHTING
Lloyd B. Logan, 4884 Bessie Ave.,
St. Louis, Mo. 63115
Filed Dec. 6, 1965, Ser. No. 512,275
U.S. Cl. 315—211   7 Claims
Int. Cl. H05b 37/02; 37

The invention relates to sequencing devices for electric display lighting.

It is an object of the invention to provide automatic means for sequentially energizing individual display lights or separate groups of display lights, varying the brilliance of each light or group of lights during its sequence, and providing one sequence in which all the lights would be illuminated at full brilliance.

The foregoing and additional more detailed objects and advantages are attained by the construction described hereinafter and illustrated in the accompanying drawings in which.

Figure 1:
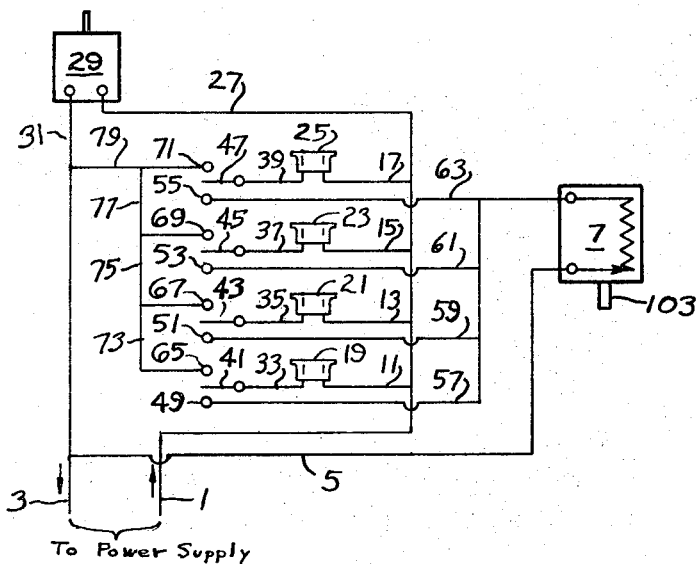
FIG. 1 is a schematic circuit diagram of a sequencing device embodying my invention.

As shown in the circuit schematic diagram of FIG. 1, the sequencing device has leads 1 and 3 connected to a source of electric power. Lead 1 is connected in parallel through lines 11, 13, 15 and 17 to one side of receptacles 19, 21, 23 and 25 and through line 27 to constant speed motor 29, which is connected to power lead 3 by line 31. The other sides of receptacles 19, 21, 23 and 25 are connected by lines 33, 35, 37 and 39 to normally open double throw switches 41, 43, 45 and 47, one contact 49, 51, 53 and 55 each of which is connected by lines to the one side of a resistance varying device such as rheostat 7, the other side of which is connected by line 5 to power lead 3, so that when the switches are thrown to close the last-named contacts, rheostat 7 will be in series with receptacles 19, 21, 23, 25, thus reducing the voltage through them and dimming the lights connected to them. The other contacts 65, 67, 69 and 71 of switches 41, 43, 45, 47 are connected by lines 73, 75, 77 and 79 to power lead 3, so that when the switches are thrown to close the last-named contacts, the full voltage will pass through receptacles 19, 21, 23 and 25.

Figure 2:
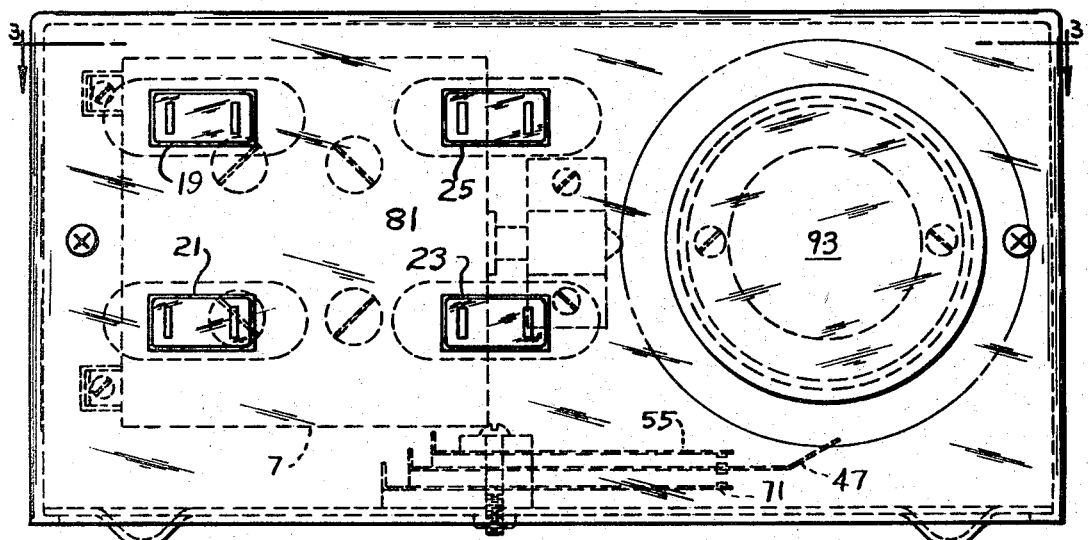
FIG. 2 is a front elevational view of the sequencing device.
Figure 3:
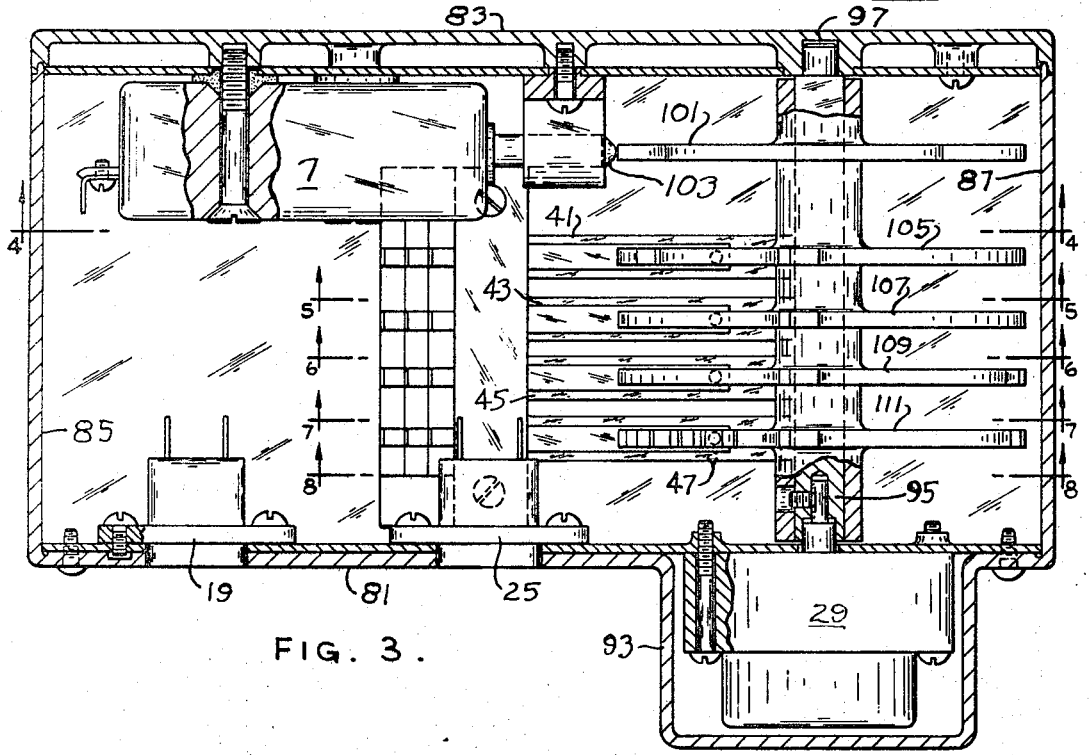
FIG. 3 is a horizontal sectional view along line 3—3 of FIG. 2.
Figure 4:
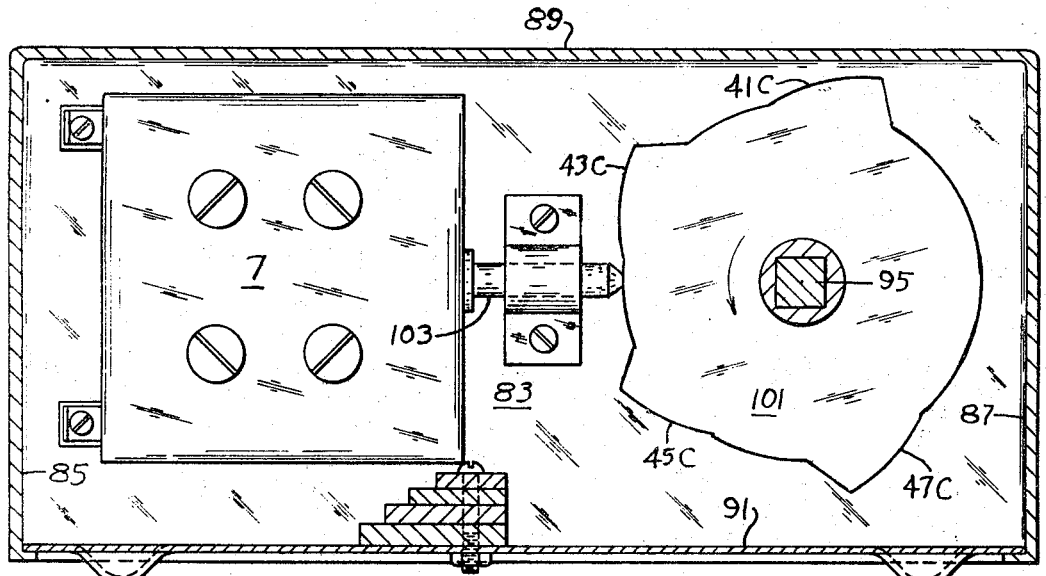
FIGS. 4–8 are vertical sectional views along lines 4—4, 5—5, 6—6, 7—7 and 8—8 of FIG. 3, showing the sequencing cams in their simultaneous relative positions.
Figure 5:
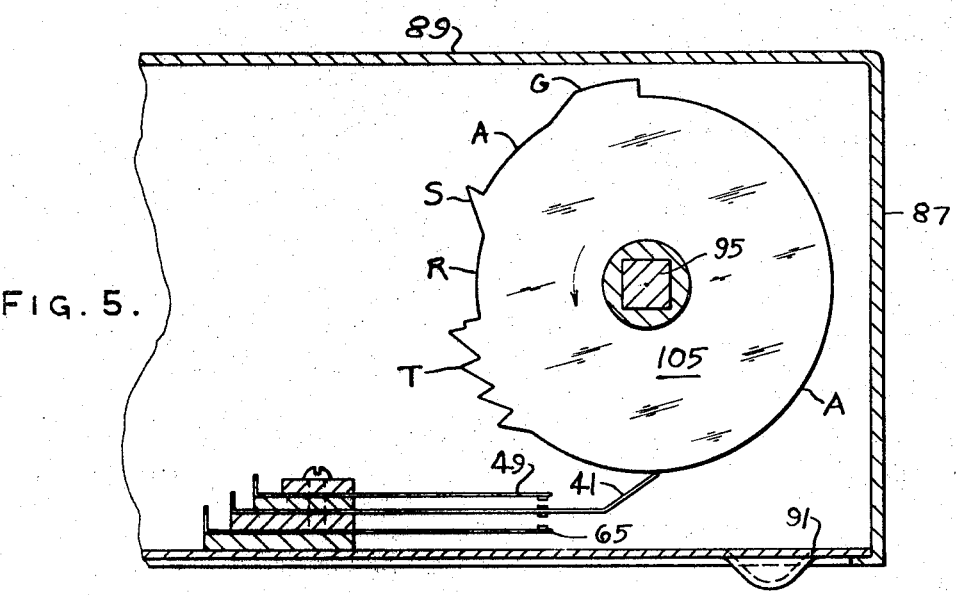
Figure 6:
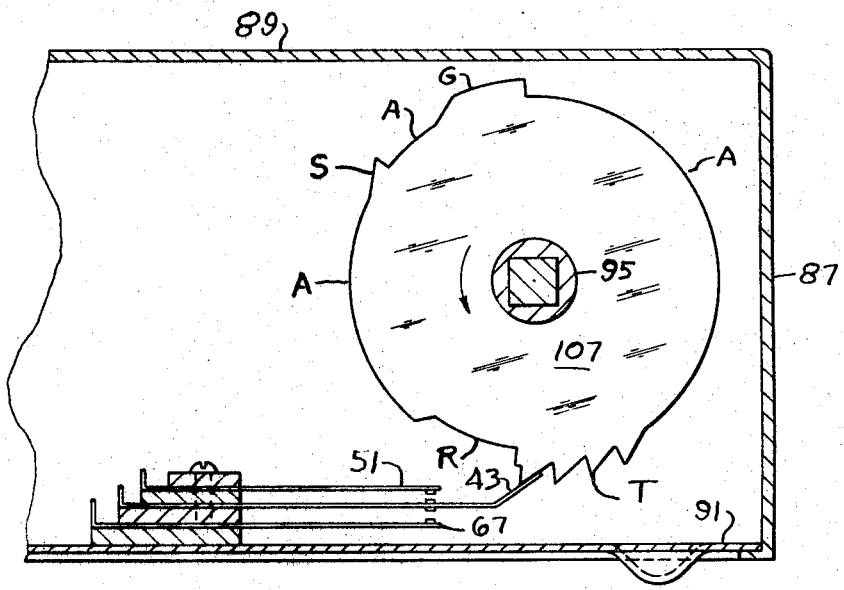
Figure 7:
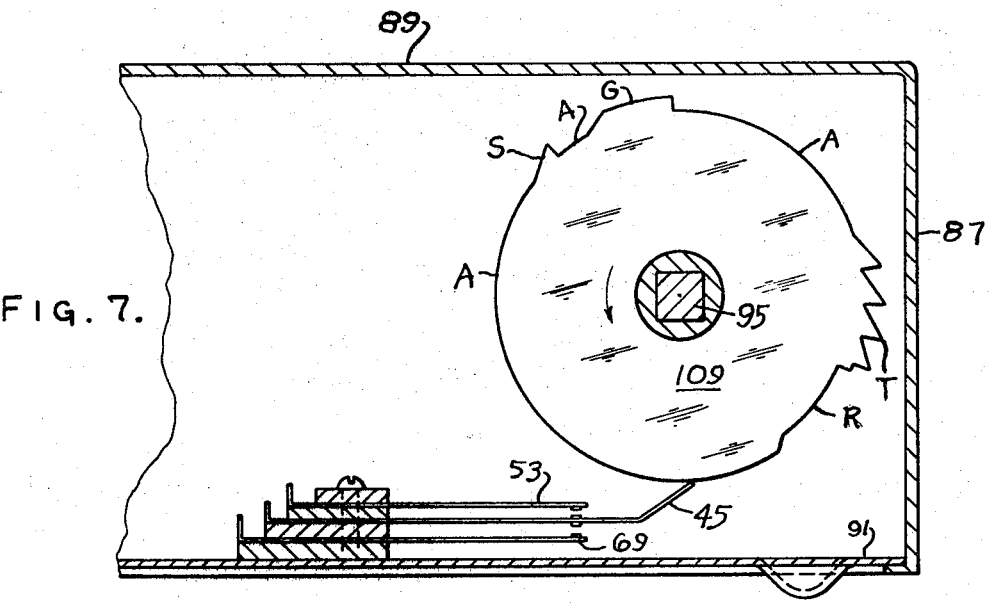
Figure 8:
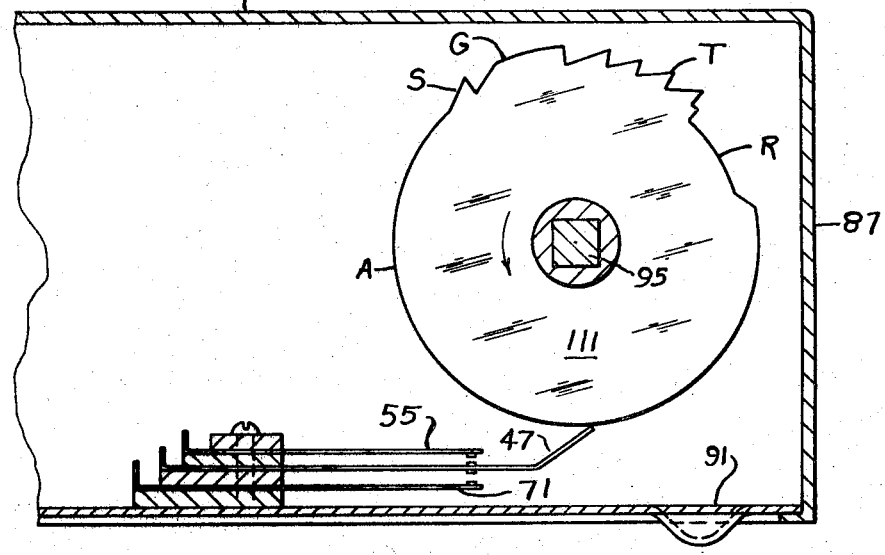

All the elements constituting the circuit of FIG. 1 are housed in a rectangular case preferably of dielectric material and having a front wall 81 (FIG. 2), rear wall 83, side walls 85 and 87, top wall 89 and bottom wall 91. In the interest of clarity, wiring has been omitted from FIGS. 2–8. Receptacles 19, 21, 23 and 25 are mounted in front wall 81 and motor 29 is mounted in a protrusion 93 from wall 81, with its squared shaft 95 extending horizontally inwardly, parallel to side wall 87, to rear wall 83 in which it is journaled at 97. Shaft 95 rigidly mounts a group of cams 101, 105, 107, 109 and 111, each having hubs with square openings for nonrotatable mounting on shaft 95. Rheostat actuating cam 101 operates rheostat 7, mounted on case rear wall 83, by engagement with rheostat plunger 103. Switch cams 105, 107, 109 and 111 operate switches 41, 43, 45 and 47 respectively. Switches 41, 43, 45 and 47 each comprises a blade similarly mounted, an upper contact leaf 49, 51, 53, 55 respectively, and a lower contact leaf 65, 67, 69, 71 respectively, all mounted in vertically spaced relation with each other in blocks of laminated dielectric material. The switch blades are all biased upwardly and the major portions of the actuating contour of each of the switch cams are arcs A of constant radius, so that when engaged with the blades of the switches, the latter will be maintained in the open position intermediate the upper and lower contacts 49, 51.

For causing engagement of the blades with the lower contacts 65, 67, 69 or 71 (as shown in FIGS. 5–8), whereby to bypass rheostat 7 and apply the full voltage to the lights, each cam is formed with a short arc G and toothed segment T of substantially greater radius than arc A, so that when arc G or toothed segment T engages a switch blade, the blade will move downwardly into engagement with the last named contacts. Arcs G are at the same angular position on all cams, so that during a short period of each cycle, all receptacles 19, 21, 23 and 25 will receive the full voltage, with resultant brilliance of all lights. Toothed segments T of successive cams are spaced apart substantially equiangularly from each other, so that at different times during the cycle the teeth of each cam urge the associated switch blade down several times in rapid succession against the bottom contacts 65, 67, 69 or 71, causing correspondingly frequent energization at full voltage and intermittent deenergization of associated receptacles 19, 21, 23 and 25 and the lights connected to each.

Conversely, for lighting any of the four groups of lights with their brilliance controlled by rheostat 7, each cam surface is formed with an arc R immediately posterior to toothed segments T and of substantially less radius than major arcs A, so that when arcs R engage the switch blades, the upward bias on the blades will move them upwardly into engagement with upper contacts 49, 51, 53 or 55, placing the associated receptacle in series with the rheostat and thus varying the brilliance of the lights connected to the associated receptacle in accordance with the rheostat setting as long as the switch blade remains in engagement with the upper or rheostat contacts.

Rheostat cam 101 is of generally circular contour with four cusps 41c, 43c, 45, and 47c at the same relative angular positions respectively as reduced radius arcs R of switch cams 105, 107, 109 and 111, so that, when the rheostat is placed in series with any of the receptacles by the engagement of arcs R with the switch blades, as described above, the appropriate cusp will depress the rheostat plunger 103, causing the resistance through the rheostat to increase from a minimum when the plunger is in engagement with the circular contour of cam 101 to a maximum when the outer extremities of each cusp is reached, thus causing the associated lights to go from bright to dim during the period when each receptacle is controlled by the reduced radius arcs R.

Anterior to maximum radius arcs G, each switch cam is provided with a single tooth S, teeth S of successive cams being angularly adjacent to each other with tooth S of cam 105 being spaced from three tooth-lengths arc G and the corresponding tooth of cam 111 adjoining the sloping approach of arc G. This will cut out the rheostat and cause successive rapid brilliant flashes of each circuit immediately before the full illumination of all circuits caused by arc G.

Operation of the device is as follows: Four display light circuits, e.g., four strings of Christmas tree lights, are connected respectively to receptacles 19, 21, 23 and 25, and power leads 1 and 3 are connected to a source of electric power.

With the cams in the position illustrated in the drawings, all the switches are open and all lights are off. When the power leads are connected to the source of power, motor 29 begins to rotate shaft 95 and cams 101, 105, 107, 109 and 111 in a counterclockwise direction as viewed in FIGS. 4–8. The last tooth of toothed segment T of cam 107 urges switch blade 43 into engagement with contact 67, to place the full voltage on receptacle 21, causing a brilliant flash of the lights connected thereto. As rotation continues, switch blade 43 engages reduced radius arc R of cam 107, and is biased into engagement with contact 51, which places rheostat 7 in series with receptacle 21, and cusp 43c of rheostat cam 101 depresses plunger 103 to gradually reduce the brilliance of the lights connected to receptacle 21. As receptacle 21 is deenergized by arc A of cam 107 centering switch blade 43, toothed segment T of cam 105 engages switch 41, causing rapid successive flashing of the lights connected to receptacle 19. This is followed by engagement of switch blade 41 with reduced arc R of cam 105, which permits blade 41 to move upwardly into engagement with rheostat contact 55, at which points cusp 41c of rheostat cam 101 depresses plunger 103 to gradually reduce the brilliance of the lights connected to receptacle 19. As shaft 95 continues rotation, single teeth S of cams 105, 107, 109 and 111 engage switch blades 41, 43, 45 and 47 respectively in rapid succession, causing an instantaneous brightening or flash of each of the lights connected to the respectively associated receptacles, after which all of the large radius arcs G of cams 105, 107, 109 and 111 simultaneously depress the associated switch blades into engagement with the rheostat bypass contacts 65, 67, 69 and 71, causing full illumination of all the lights. After arcs G have passed the switch blades, arcs A of cams 105, 107 and 109 engage their switch blades to open the switches, but toothed portion T of cam 111 successively depresses switch blade 47 to provide successive flashes of the lights connected to receptacle 25. Further rotation of the shaft causes depressed arc R of cam 111 to engage switch blade 47, thus cutting in rheostat 7, and simultaneously cusp 47c depresses rheostat plunger 103 to cause a gradual dimming of the lights connected to receptacle 25. As shaft 95 continues to rotate, arc A of cam 111 engages switch blade 47 returning the latter to the center or open position, thereby deenergizing receptacle 25. Continued rotation of the shaft causes toothed portion T of cam 109 to engage switch blade 45, producing successive flashes of the lights connected to receptacle 23, immediately after which depressed arc R of cam 109 engages switch blade 45, permitting the upward bias on blade 45 to cause the blade to engage contact 53, thus cutting in rheostat 7 and causing a gradual dimming of the lights connected to receptacle 23 as rheostat cam cusp 45c simultaneously depresses rheostat plunger 103. As rotation of shaft 95 proceeds, arc A of cam 109 engages swtich blade 45, opening the switch, and toothed portion T of cam 107 engages switch blade 43 to recommence the cycle by successive flashes of the lights connected to receptacle 21. As long as the device is energized the same cycle will be repeated, its frequency depending upon the speed of motor 29.

The details of the device may be modified substantially without departing from the spirit of the invention and the exclusive use of such modifications as come within the scope of the appended claims is contemplated.

What is claimed is:

1. A sequencing device for a plurality of electric light circuits comprising a resistance varying device, a plurality of normally open double throw switches, each of said switches having a first contact connected direct to one of said circuits and a second contact connected to the corresponding circuit through said resistance varying device, and means for sequentially actuating said switches between their normally open position and said first and second contacts, and additional means for actuating said resistance varying device to vary its resistance when said switch is closed through said second contact.

2. A sequencing device according to claim 1 in which said first named means comprises a rotatable shaft and a plurality of cams rigidly mounted thereon and having peripheral surface portions engageable with said switches.

3. A sequencing device according to claim 2 in which each of said cams has a maximum radius surface portion engageable with one of said switches to move the latter into engagement with one of its contacts, a minimum radius surface portion to permit said switch to engage its other contact, and a surface portion of intermediate radius to maintain said switch open.

4. A sequencing device according to claim 3 in which said additional means comprises another cam rigidly mounted on said shaft, said resistance varying device having actuating means engageable with the periphery of said other cam, said other cam having surface portions formed to move said means from its normal position when said first named cams move any of said switches to engage said second contact.

5. A sequencing device according to claim 2 in which all of said cams have surface portions in the same angular position for simultaneously throwing all said switches to engage their first contacts and thus fully energize all light circuits simultaneously.

6. A sequencing device according to claim 5 in which the major peripheral surface portion of each cam maintains the associated switch in open position spaced from both contacts.

7. A sequencing device according to claim 6 in which each cam has additional surface portions of greater and less radii than said major surface portion for causing the associated switch to move alternatively to both contacting positions, said additional surface portions of each cam being at different relative angular positions about the axis of rotation.

References Cited

UNITED STATES PATENTS 1,772,606   8/1930   Hopkin _____ 315—318 X
3,050,597   8/1962   Yakem _____ 315—317 X JOHN W. HUCKERT, *Primary Examiner.*

R. F. POLISSACK, *Assistant Examiner.*

U.S. Cl. X.R.

315—216, 226, 316, 317, 318, 319, 320, 323; 340—334, 335. 338. 339, 378